June 18, 1968   J. T. NEISWINTER ETAL   3,389,223

SOUNDING DEVICE WITH SIGNAL VOLTAGE CONVERTER

Original Filed April 10, 1964

INVENTOR

JAMES T. NEISWINTER
CARL N. PEDERSON

BY *Strauch, Nolan, Neale, Nies & Kurz*

ATTORNEYS

United States Patent Office 3,389,223
Patented June 18, 1968

3,389,223
SENDING DEVICE WITH SIGNAL VOLTAGE CONVERTER
James T. Neiswinter, Garden City, N.Y., and Carl N. Pederson, Westmont, Ill., assignors to The Pioneer Electric and Research Corporation, Forest Park, Ill.
Original application Apr. 10, 1964, Ser. No. 358,739. Divided and this application Oct. 20, 1967, Ser. No. 676,763
9 Claims. (Cl. 178—17)

ABSTRACT OF THE DISCLOSURE

A signal voltage converter circuit for connecting between data communication equipment operable at low voltage levels and transmission lines normally operable at high voltages. The low voltage output signals from the data communication equipment are utilized to control an electronic switching circuit to key a higher voltage telegraph loop. The electronic switch includes a Shockley diode and the current carrying terminals of a silicon controlled rectifier in series across input terminals of a telegraph loop. The converter includes two circuits which generate alternating voltage control signals representing line control and signal transmission bit conditions, one of which circuits applies control pulses to extinguish the Shockley diode to accomplish quick extinction of current conduction through the silicon controlled rectifier to electronically key the loop to "open." The other circuit applies control pulses of sufficient potential level to the control terminal of the silicon controlled rectifier to cause the rectifier to fire and key the loop to "closed." A "Request Send" circuit in the converter renders the "loop open" control circuit subject to being biased inoperative whenever the "loop closed" control circuit is rendered operative by data bit transmission.

Cross-reference to related application

This application is a division of application Ser. No. 358,739, filed Apr. 10, 1964.

Background of the invention

The present invention relates to signal converters which may be used as interface between a low voltage data transmitting and receiving device, such as a business machine, and a high voltage telegraph loop as is normally supplied by telephone or telegraph companies, and more particularly to a novel circuit arrangement for use at the location of a business machine as the send circuit so that the business machine may communicate directly to a conventional telecommunication line.

The signal voltage on the telegraph loop is comparatively high, and usually 130 or 260 volts, with a current flow of about 60 ma. for the mark condition and zero current for the space condition. Normally, batteries are provided by a central office, a fixed load resistance is present at the receiver station and a suitable keyer is provided at the send station to generate the mark signal voltage by closing the telegraph loop and the space signal by opening the loop circuit. A mark signal is conventionally produced by closing the circuit so that the battery voltage is impressed across the load resistance and a space signal is characterized by an open circuit in timed relation to the start pulse.

On the other hand, business machines customarily operate with comparatively low signal voltages. The E. I. A. (Electronic Industry Association) standard specifies a negative voltage of between —3 and —20 for a mark and between about +3 and +20 for a space, with a low current flowing for one or both conditions. In some cases a business machine may use the negative voltages for mark and about zero volts for space. In other cases the machine may use about zero volts for mark and the plus voltages shown for space. In any of the cases, the problem presented is one of converting low voltages signals from the business machine system to correlated signals in the higher voltage telegraph loop system.

Summary of the invention

The principal object of the present invention is to provide an improved interface or signal voltage converter for use with comparatively low signal voltage equipment such as business machines to thereby adapt such equipment to send over conventional telephone or telegraph lines using their customary comparatively high voltage signals.

The send circuit converts the low voltage business machine signals to the high voltage telegraph loop signals. The power supply, which furnishes the voltages required for the operation of the transistors, may be of any suitable type, and forms no part of the present invention.

Other objects of the invention are to provide:

(1) a novel send circuit employing a silicon controlled rectifier (SCR) together with a Shockley diode for effecting the keying of the telegraph loop;

(2) a novel send circuit having alternating voltage generators for applying repeated control voltages to the SCR in the send circuit to maintain it in the desired conductive or non-conductive condition; and (3) alternating voltage generating circuits employing unijunction transistors that are readily controlled by transistor circuits responsive to the comparatively low level signals produced by the data processing equipment.

Brief description of the drawings

These and other objects of the invention will become more fully apparent from the claims, and from the description as it proceeds in connection with the appended drawings wherein:

Description of the disclosed embodiment

Figure 1:
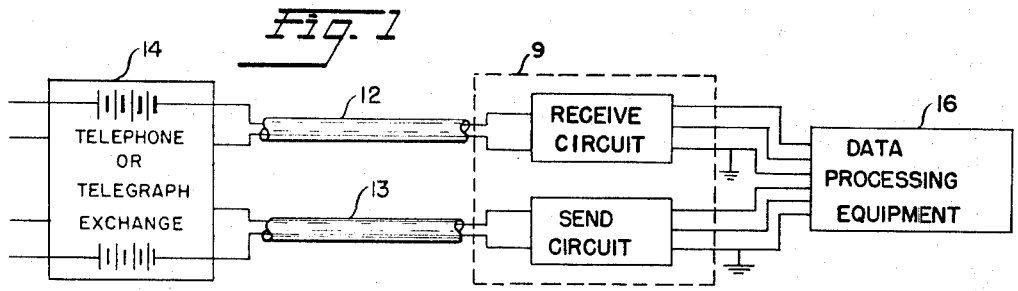
FIGURE 1 is a block diagram showing the novel signal converter of the present invention at a location adjacent the low signal voltage equipment and connected between an exchange office of a telephone or telegraph system and the input and output of the low signal voltage equipment.

Referring now to FIGURE 1 of the drawings, the present invention is incorporated within the block 9 representing the signal converter of a communications system utilizing a pair of transmission lines 12 and 13 that are connected through a telephone or telegraph exchange 14 to a further piece of data processing equipment (not shown) containing a sending circuit and receiving circuit which may be identical to that of blocks 9 and 16. At the local station, normally at close proximity to the signal converter 9 of the present invention, there is a business machine 16 that operates with input data received from transmission line 12 and which may send out data over transmission line 13.

Figure 2:
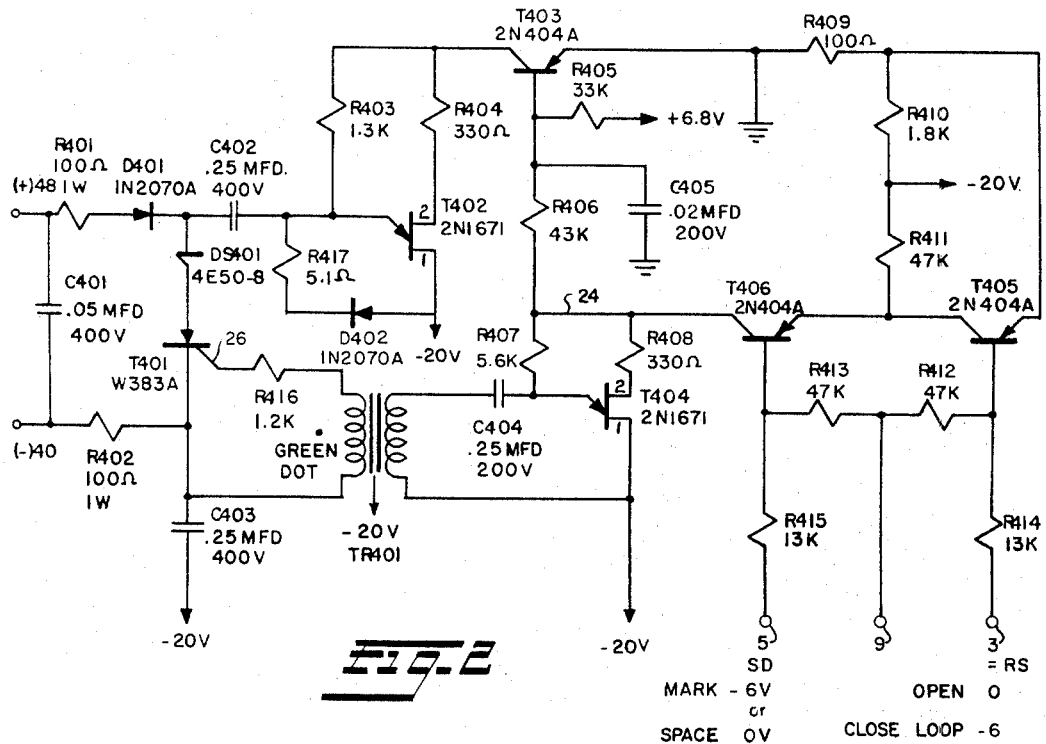
FIGURE 2 is a circuit diagram of a send circuit embodying the present invention.

The overall function of the sender circuit of FIGURE 2 is that for an input voltage of about —6 volts on the SD (Send Data) terminal 5 from the business machine, this circuit will close the telegraph loop through transmission line 13 and exchange 14 connected to its output terminals 8 and 10 so that 60 ma. flows, and for an input of about zero volts it will open the telegraph loop so that no current flows.

An additional function is that for a voltage of about zero on its RS (Request Send) terminal 3, it will hold the telegraph loop open; and for a voltage of about —6 volts on terminal 3, this circuit will close the loop as far as this part of the circuit is concerned, and the mark and space voltages on the SD terminal 5 will then control the condition of the loop.

In the idle condition of the business machine on the sending side, about zero volts is applied to the base terminals of both transistor T405 and transistor T406 and both are thereby biased so as to be non-conducting.

Transistor T404 is a unijunction transistor and has −20 volts on its base 1. It will therefore require a voltage on its emitter more positive than about −8 volts to fire it.

On the basis that the base 1 to base 2 resistance of unijunction transistor T404, when non-conducting, is about 10,000 ohms, the −20 volts on its base 1 will appear through resistor R407 to the emitter as about −16 volts, which is not sufficiently positive relative to base voltage −20 to fire the unijunction. Unijunction transistor T404 is therefore normally non-conducting.

The current from the −20 volts connection to base 1 will flow through the unijunction, and through resistor R406 and the base to emitter path of transistor T403, to make transistor T403 normally conducting.

With transistor T403 conducting, near zero voltage is applied through resistor R404 to base 2 of a second unijunction transistor T403 and via a parallel path through resistor R403 to capacitor C402 and the emitter of unijunction transistor T402. Base 1 of unijunction transistor T403 is connected to −20 volts.

When capacitor C402 charges in a positive direction to about −8 volts, unijunction transistor T402 will fire and quickly discharge C402.

C402 will continue to charge slowly and discharge quickly so long as the near zero voltage is applied to resistors R403 and R404.

In the marking condition the telegraph loop may have 60 ma. flowing in it which flows through a silicon controlled rectifier (SCR) T401, and a Shockley diode DS401 which for purposes of this description are assumed to be fired at this time.

Each time the unijunction transistor T402 fires to discharge C402, a large negative pulse is applied to the junction between Shockley diode DS401 and an ordinary diode D401.

This large negative pulse momentarily diverts the current normally flowing in the loop circuit from the central office through resistor R401, diode D401, Shockley diode DS401, SCR T401 and resistor R402 back toward the central office, so that the current flows through C402. Therefore, both Shockley diode DS401 and SCR T401 are left with little or no forward current. This condition causes both of these last mentioned components to cease conducting.

Shockley diode DS401 will cease conducting sooner than SCR T401, as it requires a shorter negative pulse, which is why it is used in the circuit; and with Shockley diode DS401 non-conducting, SCR T401 must become then non-conducting. The SCR T401 does not begin conducting until a positive going signal is applied to its control element 26.

Therefore, to review, with about zero volts applied to both the SD terminal 5 and RS terminal 3, unijunction transistor T402 will oscillate and the negative going discharge pulses applied through capacitor C402 to the telegraph loop will extinguish both Shockley diode DS401 and SCR T401 and cause the loop current to become zero.

One pulse through capacitor C402 would be sufficient to make the loop current zero. However, if, after the current had become zero, some stray pulse should refire SCR T401, the loop would go marking even though the business machine remained as sending a space. The purpose of the continuous stream of negative pulses all during the spacing condition of the business machine is so that if a stray pulse should fire the SCR T401, the next negative pulse from capacitor C402 would extinguish it again and only an extremely short marking pulse would be applied to the loop.

When SCR T401 does fire, a high negative going change is created at the junction of Shockley diode DS401 and capacitor C402. Diode D402 is for the purpose of diverting this negative pulse away from the emitter of unijunction transistor T402 so that it is not damaged.

Diode D-401 is for the purpose of preventing damage to unijunction transistor T402 in case the plus and minus 130 volts batteries applied at the central office to the tip and ring of the telegraph loop are applied in the wrong direction.

When −6 volts is applied to the RS (Request Send) terminal 3, transistor T405 goes conducting and applies about zero volts to the emitter of transistor T406. Transistor T406 remains non-conducting because of about zero voltage on its base.

When −6 volts for a mark is applied to the SD (Send data) terminal 5, transistor T406 goes conducting and about zero volts is applied to resistors R408, R407 and R406 through lead 24.

The near zero volts on resistor R406 together with the +6.8 volts through resistor R405 causes transistor T403 to go non-conducting. Unijunction transistor T402 then stops from oscillating.

The near zero volts on resistors R407 and R408 in combination with capacitor C404 cause unijunction transistor T404 to start oscillating at a frequency, preferably in the audio frequency range.

This audio frequency signal is transmitted through transformer TR401 and creates positive and negative voltage on its secondary, the positive pulses of which fire SCR T401. This causes Shockley diode DS401 to fire and the loop accordingly becomes closed and the 60 ma. marking current flows.

Again, only one pulse is necessary to close the loop, but if only one pulse were used, a momentary opening of the loop at the central office or any other place, due to testing or rearrangements, would extinguish both SCR T401 and Shockley diode DS401 and the loop would remain open. The continuous stream of pulses that reach the control grid of SCR T401 during the marking condition of the business machine assure that, after any external opening of the loop which would extinguish SCR T401 will be fired again as soon as the external open of the loop is removed.

Capacitor C401 is for the purpose of slowing down the build up of voltage across Shockley diode DS401 and SCR T401 when the loop is opened so that these components are not refired by this voltage. If a relay with considerable inductance is in series with the loop, the inductive kick caused by stopping the current in this relay may cause a refiring of the SCR and the circuit would oscillate due to this condition.

The remaining components not specifically mentioned are used in their normal manner well-known to those skilled in this art, and further discussion is therefore deemed unnecessary.

The phase alternating voltage signal as used in the claims is intended to cover all types of non-steady voltage signals including output signals from circuits such as, but not limited to, multi-vibrators which may be square waves and from the circuits here employing unijunction transistors which may have a saw-tooth or other configuration.

From the foregoing, it is apparent that there is provided by the present invention an interface or buffer unit uniquely adapted for connection to a piece of office data processing equipment to enable it to send directly the comparatively high marking and spacing signal voltages present on a conventional telephone or telegraph line. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A signal converter for keying a telegraph loop comprising a transmission line powered by batteries at a telecommunications exchange with mark and space voltage signals in timed relation in accord with corresponding comparatively low voltage output signals from data processing equipment, said converter comprising: a pair of terminals connected to the transmission line so that when an electrical circuit between said terminals is closed, a telegraph loop is completed through a circuit including said transmission line and said central station; a circuit connected between said terminals containing in series relationship a Shockley diode and a silicon controlled rectifier poled in the same direction with the positive current carrying terminals of said silicon controlled rectifier connected between the negative current carrying terminal of said Shockley diode and one of said pair of terminals, said Shockley diode being a diode which will cease conducting due to a shorter negative current pulse than necessary to cause a silicon controlled rectifier to become non-conductive; a first circuit which when energized generates an alternating voltage signal; means including a capacitor for applying said alternating voltage signal to the positive current carrying terminal of said Shockley diode for rapidly opening the circuit between said terminals and for extinguishing current conduction through said silicon controlled rectifier; a second circuit which when energized generates an alternating voltage signal; means for applying the signal from said second circuit to a control electrode on said silicon controlled rectifier to cause said silicon controlled rectifier to fire; biasing means for controlling said first circuit and said second circuit so that only one of said first and second circuits can be energized to produce its alternating voltage signal at a time; and means including a transistor circuit which changes its conduction condition in response to a mark or space signal from said data processing equipment to thereby modify the bias circuit and control energization of said first and second circuits.

2. A signal converter as defined in claim 1 wherein said first circuit contains a unijunction transistor having a base connected to a point of reference potential together with a diode connected between said point of reference potential and the capacitor connected to said Shockley diode and poled so as to protect said unijunction transistor from damaging transient voltages.

3. A signal converter as defined in claim 2 wherein said second circuit for generating an alternating voltage signal contains a unijunction transistor and a capacitor connected to oscillate at an audio frequency, and means for inductively coupling said audio frequency signal to the control element of said silicon controlled rectifier.

4. A signal converter for keying a telegraph loop comprising a transmission line powered by batteries at a telecommunications exchange with mark and space voltage signals in timed relation in accord with corresponding comparatively low voltage output signals from data processing equipment, said converter comprising:

a pair of terminals connected to the transmission line;
a circuit component connected in series with said terminals that has a low electrical impedance when in a conducting state, a high electrical impedance when in a non-conducting state, and a control element for causing the component to change from a non-conductive state to a conductive state;
means including a first circuit for continuously generating an alternating voltage signal for applying a voltage to a point in the circuit between one of said terminals and said circuit component for causing the component to change from a conductive state to a non-conductive state; and
means responsive to mark and space input signals from said data processing equipment to apply an actuating voltage to said control element and a disabling voltage signal to said alternating voltage generating means in response to reception of one of said input signals, and to apply an actuating voltage to said alternating voltage generating means and a disabling voltage signal to said control element in response to reception of the other of said input signals.

5. A signal converter as defined in claim 4 having:
an input circuit connected to receive said input signals from the data processing equipment and responsive to change its conduction condition in response to mark or space signals;
circuit means connected from said input circuit to said first circuit for continuously generating an alternating voltage signal for maintaining said circuit component in its non-conducting state in response to a spacing signal;
a second circuit for continuously generating an alternating voltage signal for connection to said control element; and
circuit means connected from said input circuit to said second circuit for maintaining said circuit component in its conducting state in response to a marking signal.

6. A signal converter as defined in claim 5 wherein the first and second circuits for continuously generating an alternating voltage when energized each contain a capacitor alternately charged and discharged through a circuit arrangement including a unijunction and said circuit component in an SCR.

7. In a keying circuit for sending a coded signal comprising marking and spacing voltage signals in timed relation through a transmission line powered by batteries at a central station, a pair of terminals connected to the transmission line so that when an electrical circuit between said terminals is closed a telegraph loop is completed through a circuit including said transmission line and said central station; a circuit between said terminals comprising a silicon controlled rectifier having its current carrying terminals connected in series with the current carrying circuit and poled to conduct, when fired, electrical current supplied through the transmission line; and a firing circuit for said silicon controlled rectifier comprising means for continuously generating an alternating voltage signal during the time interval that the circuit between said terminals is to be closed, to thereby minimize the length of any time increment when said circuit is inadvertently opened resulting from a non-conductive condition of said silicon controlled rectifier.

8. The keying circuit as defined in claim 7 wherein said circuit between said terminals further comprises: a first diode for protecting said silicon controlled rectifier against damage in event of polarity reversal on said terminals; a second diode in series between the first diode and said silicon controlled rectifier to decrease the time increment necessary to extinguish current conduction through said silicon controlled rectifier; and means including a capacitor for applying an alternating voltage to the circuit at a junction between said first and second diodes for extinguishing current conduction through said silicon controlled rectifier.

9. The keying circuit as defined in claim 8 wherein the means for applying the alternating voltage to the junction includes a transistor and further comprising a unidirectional conducting device connected between said capacitor and a point of reference potential and poled to pass transient voltages appearing on said transmission and coupled through said capacitor to the power supply and thereby avoid damage to said transistor.

No references cited.

THOMAS A. ROBINSON, *Primary Examiner.*